(12) United States Patent
Sheldon et al.

(10) Patent No.: US 12,249,792 B2
(45) Date of Patent: Mar. 11, 2025

(54) PROTECTIVE OUTLET COVER WITH DETACHABLE SAFETY ATTACHMENT

(71) Applicants: Stephen D. Sheldon, Amery, WI (US); Matthew E. Sheldon, New Richmond, WI (US)

(72) Inventors: Stephen D. Sheldon, Amery, WI (US); Matthew E. Sheldon, New Richmond, WI (US)

(*) Notice: Subject to any disclaimer, the term of this patent is extended or adjusted under 35 U.S.C. 154(b) by 330 days.

(21) Appl. No.: 17/733,443

(22) Filed: Apr. 29, 2022

(65) Prior Publication Data

US 2022/0376437 A1 Nov. 24, 2022

Related U.S. Application Data

(60) Provisional application No. 63/190,436, filed on May 19, 2021.

(51) Int. Cl.
*H01R 13/639* (2006.01)
*H01R 13/447* (2006.01)
*H02G 3/08* (2006.01)

(52) U.S. Cl.
CPC ....... *H01R 13/6395* (2013.01); *H01R 13/447* (2013.01); *H02G 3/081* (2013.01)

(58) Field of Classification Search
CPC ... H01R 13/6395; H01R 13/477; H02G 3/081
USPC .......................................................... 439/135
See application file for complete search history.

(56) References Cited

U.S. PATENT DOCUMENTS

| | | | |
|---|---|---|---|
| 4,618,200 A * | 10/1986 | Roberts | H01R 13/6395 439/367 |
| 4,718,856 A | 1/1988 | Pinkerton et al. | |
| 4,851,612 A * | 7/1989 | Peckham | H01R 13/6395 174/67 |
| 5,087,796 A | 2/1992 | Norman | |
| 5,195,901 A * | 3/1993 | Correnti | H01R 13/447 174/67 |
| 5,382,755 A * | 1/1995 | Correnti | H01R 13/447 174/67 |
| 5,389,740 A | 2/1995 | Austin | |
| 5,703,329 A * | 12/1997 | Delone | H01R 13/447 174/67 |

(Continued)

FOREIGN PATENT DOCUMENTS

| | | | | |
|---|---|---|---|---|
| WO | WO-0103248 A1 * | 1/2001 | | H01R 13/447 |
| WO | WO-2017027492 A1 * | 2/2017 | | H02G 3/088 |
| WO | 2021/111382 A1 | 6/2021 | | |

*Primary Examiner* — Peter G Leigh
(74) *Attorney, Agent, or Firm* — Westman, Champlin & Koehler, P.A.; Amanda M. Prose

(57) ABSTRACT

A safety assembly having a cover plate for mounting to a pre-existing electrical receptacle and a safety housing for removably attaching to the cover plate. The safety housing is a unitary construction having a front end and a back-end wall with four side walls extending therebetween to provide an open interior, wherein the front end is substantially open and configured for securing to the cover plate. The cover plate has one or more pairs of slots positioned near an opening in the cover plate for exposing a socket of the electrical receptacle and the safety housing comprises one or more attachment mechanisms configured to removably engage with the one or more pairs of slots to removably couple the safety housing the cover plate.

11 Claims, 5 Drawing Sheets

(56) References Cited

U.S. PATENT DOCUMENTS

| | | | | |
|---|---|---|---|---|
| 5,989,052 A * | 11/1999 | Fields | | H02G 3/14 439/373 |
| 5,997,318 A * | 12/1999 | Chou | | H01R 13/4534 439/136 |
| 6,051,788 A | 4/2000 | Nichols | | |
| 6,372,987 B1 | 4/2002 | Ha | | |
| 6,674,003 B1 | 1/2004 | Torres | | |
| 6,737,576 B1 * | 5/2004 | Dinh | | H02G 3/088 174/53 |
| 6,916,989 B2 * | 7/2005 | Broussard, Jr. | | H02G 3/14 174/67 |
| 7,179,996 B1 | 2/2007 | Britt et al. | | |
| 7,652,210 B2 | 1/2010 | White | | |
| 7,763,799 B2 * | 7/2010 | Johnson | | H02G 3/088 174/67 |
| 8,017,865 B1 * | 9/2011 | Baldwin | | H02G 3/14 174/67 |
| 8,569,620 B1 * | 10/2013 | Baldwin | | H02G 3/14 174/67 |
| 9,219,357 B1 * | 12/2015 | Elbaz | | H02G 3/088 |
| 9,478,956 B1 * | 10/2016 | Elbaz | | H02G 3/088 |
| 9,583,863 B1 | 2/2017 | Rittinghaus | | |
| 9,960,524 B2 * | 5/2018 | Sathyanarayana | | H02G 3/10 |
| 10,958,028 B1 * | 3/2021 | Chronister | | H01R 33/90 |
| 2006/0191702 A1 * | 8/2006 | Dinh | | H02G 3/14 174/67 |
| 2007/0181328 A1 * | 8/2007 | Dinh | | H02G 3/121 174/50 |
| 2008/0110661 A1 * | 5/2008 | Dinh | | H01R 13/5213 174/53 |
| 2008/0196921 A1 * | 8/2008 | Dinh | | H02G 3/121 220/3.6 |
| 2017/0047717 A1 * | 2/2017 | Thomas | | H02G 3/088 |
| 2017/0264059 A1 | 9/2017 | Cote | | |
| 2018/0269668 A1 * | 9/2018 | Jolly | | H02G 3/081 |
| 2019/0214770 A1 * | 7/2019 | Cyzen | | H01R 13/6392 |
| 2019/0319391 A1 * | 10/2019 | Thomas | | H01R 13/5213 |
| 2021/0210940 A1 | 7/2021 | Shentu | | |

\* cited by examiner

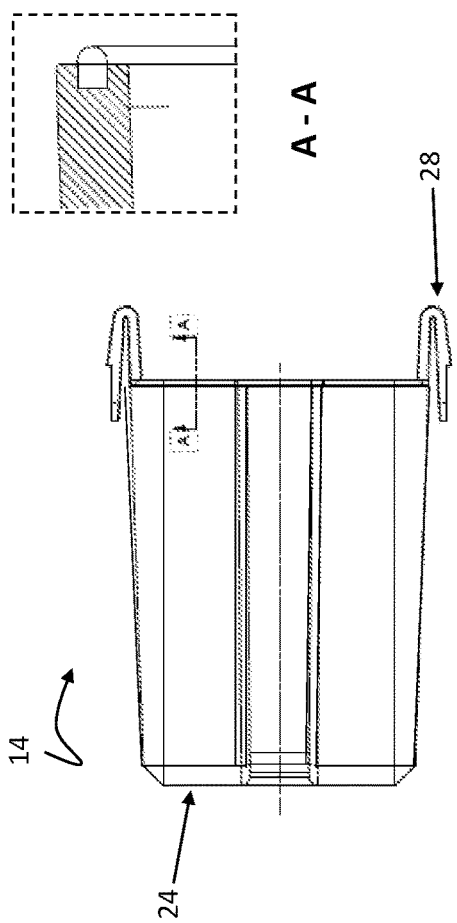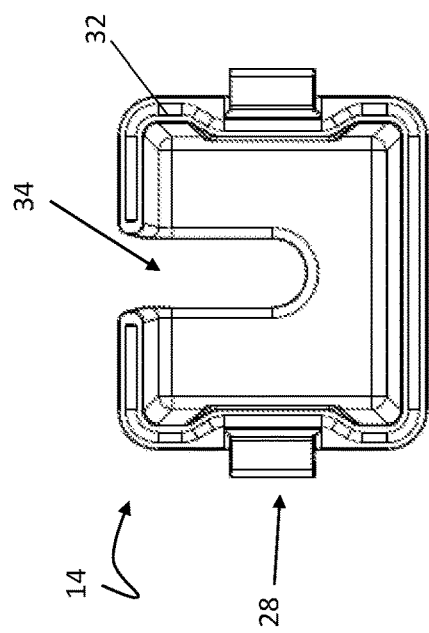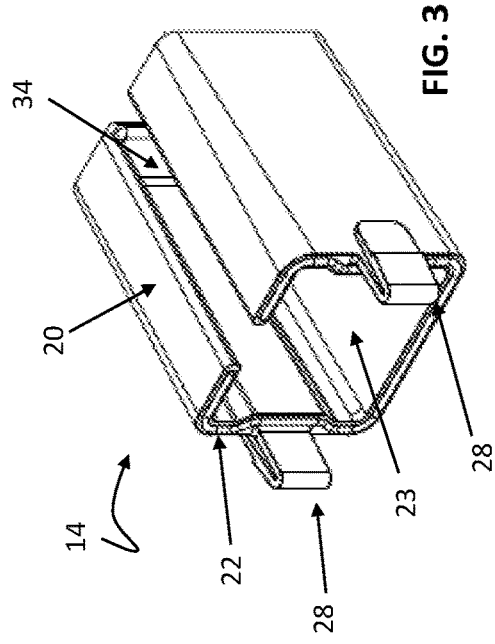

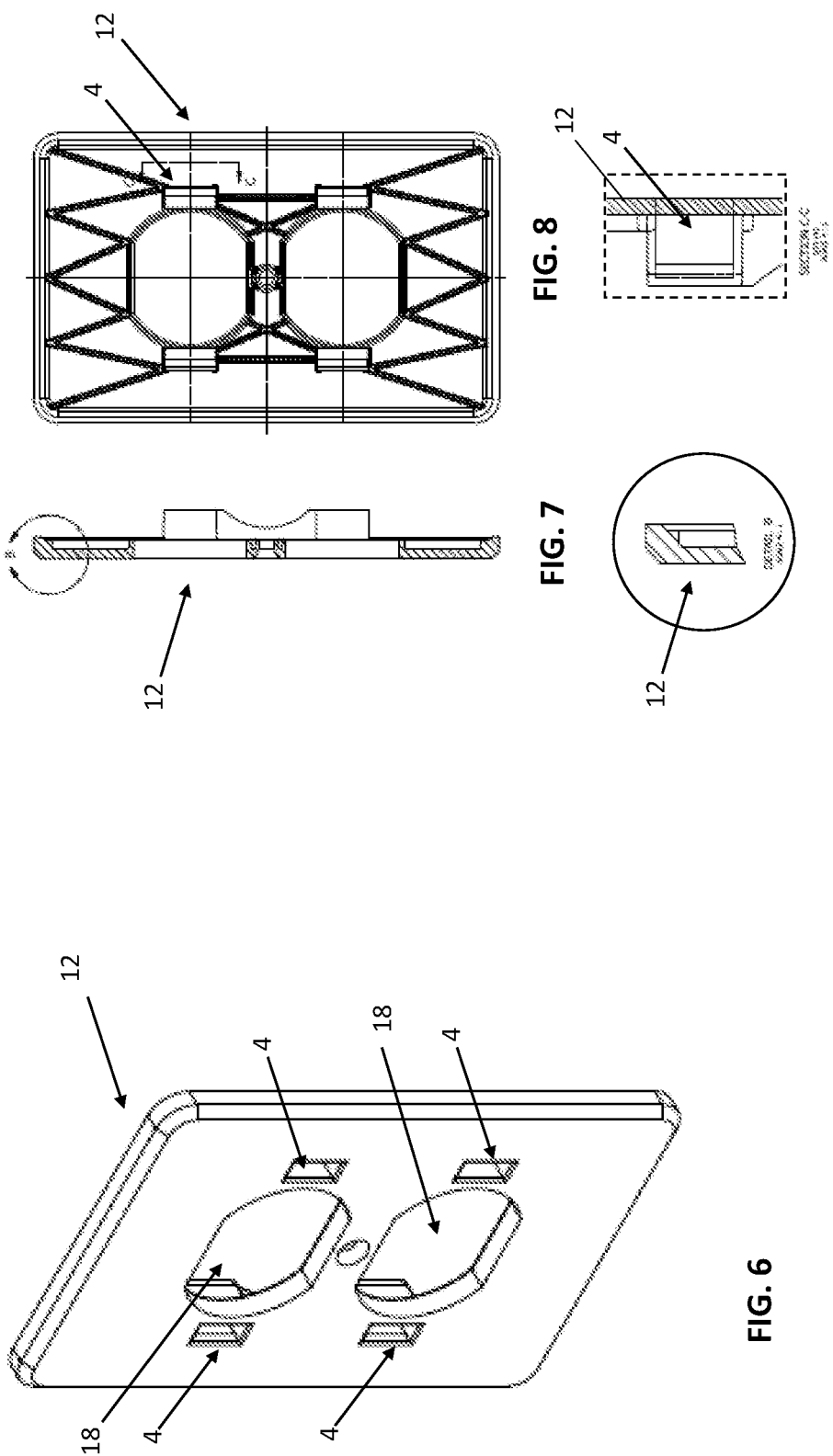

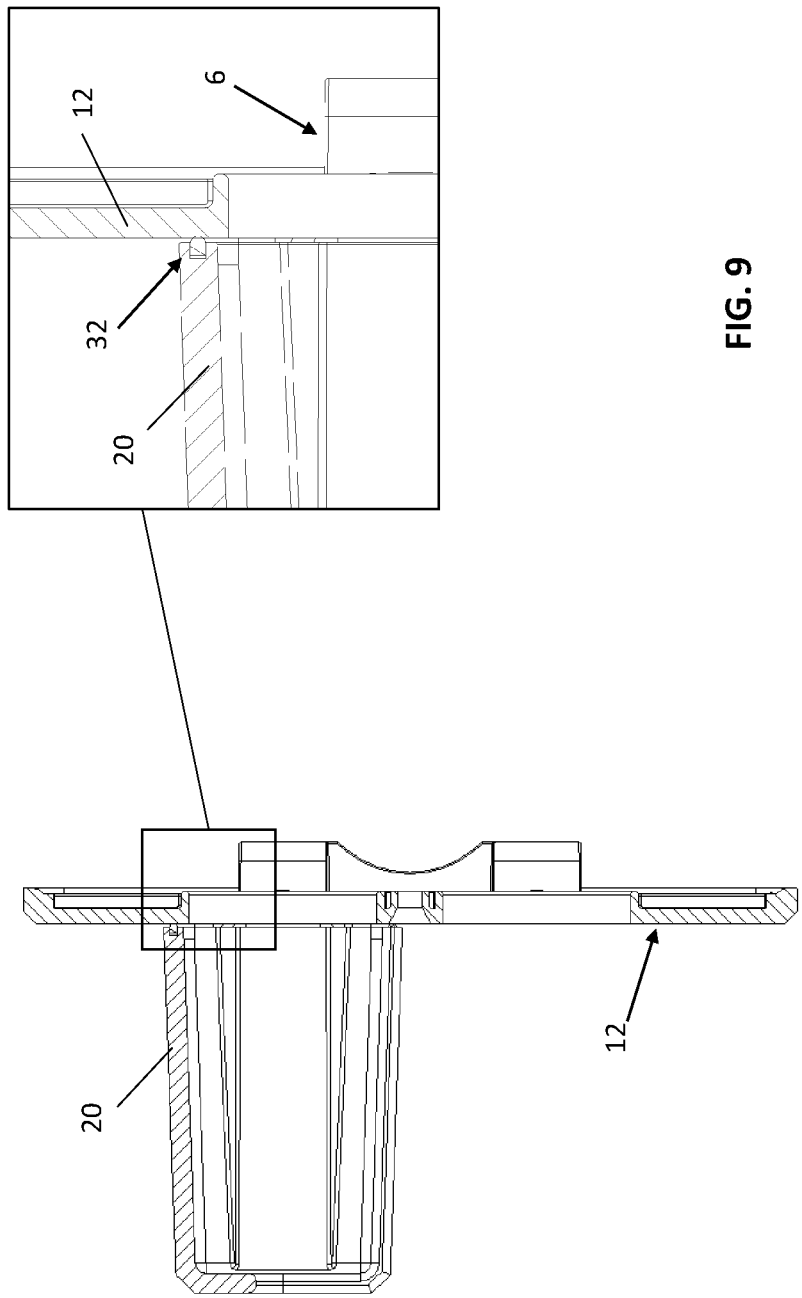

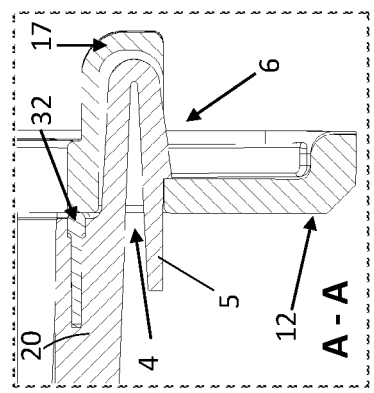
FIG. 11
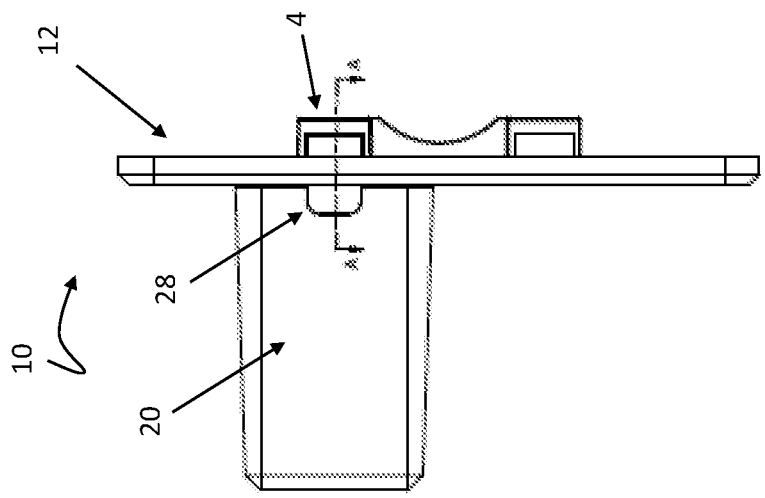
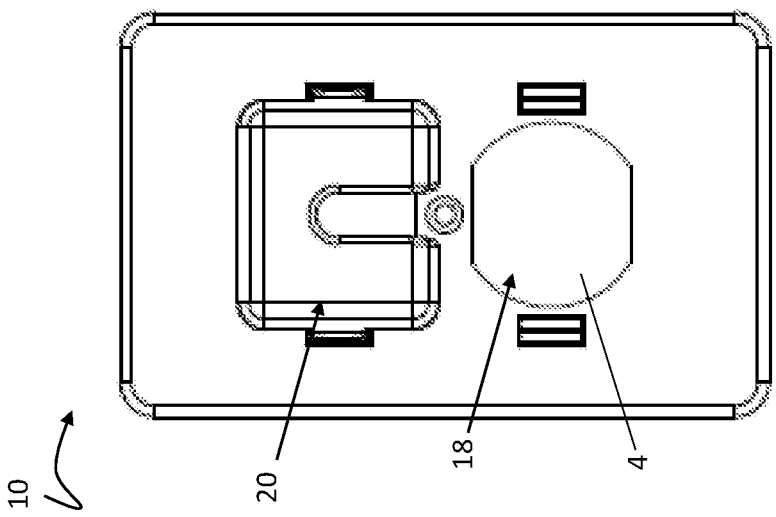
FIG. 10

PROTECTIVE OUTLET COVER WITH DETACHABLE SAFETY ATTACHMENT

CROSS-REFERENCE TO RELATED APPLICATION

This application claims priority to and the benefit of U.S. provisional patent application Ser. No. 63/190,436, filed on May 19, 2021, the contents of which are incorporated herein in its entirety.

BACKGROUND

The present invention relates to a safety assembly for electrical outlets and more specifically to an electrical outlet cover and safety device attachment for preventing the unintentional exposure of live electrical prongs from a wall outlet.

Currently, child safety products for wall outlets include bulky, aesthetically displeasing, difficult to install, and cumbersome covers for electrical plugs. Current products are complicated to use because they have multi step functionality with many moving parts and required tools.

SUMMARY

An aspect of the present disclosure relates to a safety assembly. The safety assembly has a cover plate configured for mounting to a pre-existing electrical receptacle and a safety housing for removably attaching to the cover plate. The safety housing is a unitary construction having a front end and a back-end wall with four side walls extending therebetween to provide an open interior, wherein the front end is substantially open and configured for securing to the cover plate. The cover plate has one or more pairs of slots positioned near an opening in the cover plate for exposing a socket of the electrical receptacle and the safety housing comprises one or more attachment mechanisms configured to removably engage with the one or more pairs of slots to removably couple the safety housing to the cover plate.

The safety housing further includes a channel opening in one side wall and extending along a length of the side wall and terminating in the back end wall to provide access for a cord.

The one or more attachment mechanisms of the safety housing extend from the front end and comprise snap clips.

The cover plate and the safety housing are comprised of a hard plastic.

The safety housing is rectangular in shape.

The safety housing has a width, a height, and a depth and wherein the width of the safety housing is less than the width of the cover plate, and the height of the safety housing is less than the height of the cover plate.

The front end has a perimeter that is provided with a rubber material so as to provide a flush connection between the perimeter and the cover plate when the safety housing is attached to the cover plate.

Another aspect of the present disclosure related to a tool-less method for removably attaching a safety cover to an outlet. The method includes installing a cover plate to a pre-existing electrical receptacle and plugging an electrical device plug into a socket on the electrical receptacle. Protecting the cord as plugged in includes inserting a pair of snap clips of a safety housing into corresponding slots provided on the cover plate such that the housing covers the plug and feeding a cord attached to the plug through a channel extending along a length of the safety housing.

Pushing the safety housing into contact with the cover plate and bending the snap clips inwardly and passing the snap clips through the cover plate slots secures the housing to the cover plate. As the snap clips pass through the cover plate the prongs return to a resting position where removal is selectively prevented by way of contact between a latch face of the prong and a back surface of the cover plate.

Removing the safety housing includes clamping the snap clips to release the latch face from connection with the back surface of the cover plate and pulling the safety housing away from the cover plate.

Inserting and removing the snap clips to install and uninstall the housing is a manual process not requiring tools for completing.

BRIEF DESCRIPTION OF THE DRAWINGS

FIG. 3 is a rear perspective view of the safety attachment.

FIG. 4 is a rear view of the safety attachment.

FIG. 5 is a side view of the safety attachment.

FIG. 6 is a perspective view of the protective outlet cover.

FIG. 7 is a side view of the protective outlet cover.

FIG. 8 is a rear view of the protective outlet cover.

FIG. 9 is a cross-sectional side view of the protective outlet cover and safety attachment.

FIG. 10 is a front view of the protective outlet cover with safety attachment coupled thereto.

FIG. 11 is a cross-sectional side view illustrating the attachment mechanism for the outlet cover and coupled safety attachment.

DETAILED DESCRIPTION

The present disclosure is directed to an electrical outlet cover configured for mounting to a standard wall outlet receptacle. The outlet cover is also configured to removably support a safety attachment. The safety attachment is configured to prevent the unplugging of, partial unplugging of, or tampering with an electrical cord plugged into the wall outlet and/or prevent access to the outlet receptable to prohibit the exposure to live electrical prongs. The safety attachment is removably coupled to the outlet cover via a quick connect design shared between the outlet cover and the safety attachment. That is, the outlet cover is secured over a wall outlet receptable in a standard manner, by way of screws. However, the safety attachment can be selectively coupled to the outlet cover and later removed from attachment to the outlet cover without the use of any tools. The electrical outlet cover of the assembly described herein is configured to replace a standard outlet cover for wall outlets, allowing for easy installation on any standard pre-existing wall outlet. The safety attachment described herein may be an attachment for "child proofing" electrical outlets, discouraging tampering, thereby preventing the risk of electrocution when an electrical appliance or device is plugged into a wall outlet or partially unplugged.

The outlet cover is provided with a slot on either side of each plug opening, which allows for a housing to be removably attached in a secure manner to the outlet cover. The housing is provided with a mechanism for frictionally engaging the slots, for example snap clips which allow the housing to removably engage with the outlet cover. This prevents children from accessing partially unplugged electrical prongs with their fingers and thereby prevents electrocution, prevents animals or insects from creating a connection, and limits particulate accumulation in dusty environments, such as a woodshop or painter's booth.

The safety attachment is the housing, which may also be provided with a flexible seal configured to press up against and otherwise contact the outlet cover which also provides protection to the outlet and any electrical plug inserted therein from liquid splashes, for example, where the outlet is provided in a bathroom or kitchen near a sink.

The housing may also be provided with a channel through a main body which provides the opening for allowing an electrical cord to pass therethrough, allowing the cord to be plugged into the outlet and extend away therefrom so as not to inhibit use of the electrical outlet.

When removing the housing from secure attachment to the outlet cover, in the embodiment illustrated, two snap clips located on each side of the housing can easily be pushed inwardly by a manual clamping force which disengages the clips from the cover plate and allows a user to remove the housing from attachment with the cover plate.

Figure 1:
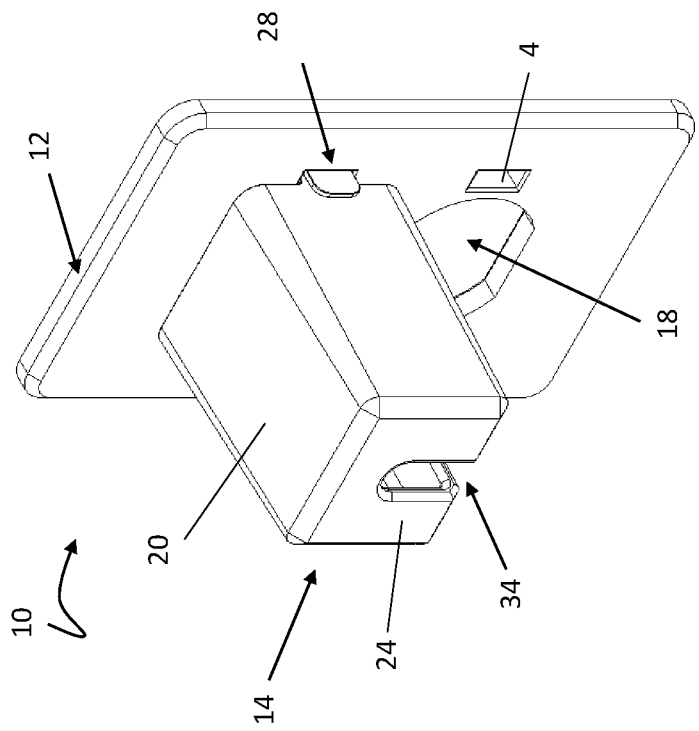
FIG. 1 is a front perspective view of a safety assembly comprising a protective outlet cover with detachable safety attachment according to embodiments described herein.

In one embodiment as illustrated in the figures, an assembly 10 comprises an outlet cover plate 12 and a safety attachment 14. The outlet cover may be similar in dimensions to a standard wall outlet cover and sized to fit standard outlets. While the embodiment illustrated shows an outlet cover for standard U.S. electrical outlets, the outlet itself may be of standard dimensions for various electrical outlets in other countries. As illustrated in FIG. 1, the outlet cover plate 12 has an opening for attachment to an electrical outlet with one screw. At least one pair of additional openings or slots 4 are provided to the cover plate and for example, one pair is provided for each wall socket opening 18 in the cover plate 12 and the slots 4 of each pair are positioned on opposing sides of the respective opening 18 for access to the wall socket.

The safety attachment 14 comprises a housing 20 having a first end 22 for connecting to the cover plate 12 and a second opposing end 24 and a length 26 extending therebetween. The housing 20 may have an overall rectangular shape that is open at the first end 22 and substantially closed one or more side lengths and the opposing end 24. In one or more embodiments, the dimensions of the safety attachment 14 are such that the safety attachment 14 does not extend above or below or beyond the sides of the cover plate 12. The safety attachment 14 may then have a footprint that is smaller than the footprint of the cover plate 12. The safety attachment does have a depth that extends outwardly from cover plate 12 to provide a cavity 23 which may accommodate a plug therein and partial length of a cord corresponding to the plug. In the embodiment illustrated, the housing 20 is substantially enclosed on three sides and the opposing end 24 where one side wall is provided with a channel opening 34. The channel 34 extends substantially along the length of the side wall and may terminate at the opposing end 24. The channel 24 may be a "U" shaped channel provided to the housing 20 to allow cord access from an electrical device to the socket for plugging in when the housing 20 is attached to the cover plate 12 and protecting the plug.

In one or more embodiments, the safety attachment 14 is a unitary or monolithic construction such that device does not include a hinged portion nor does the safety attachment open and close for purposes of covering a plug, outlet or cord. Instead, the safety attachment 14 functions by inserting the plug and part of the cord therein and there through such that the safety attachment attaches directly to the cover plate over a socket and a plug inserting into the socket. For attaching the housing 20 to the cover plate 12, the first end 22 of the housing 20 is provided with corresponding attachment mechanisms 28 which extend therefrom and are configured for insertion into the slots 4 of a pair of slots. In the embodiment illustrated, the attachment mechanisms 28 are a pair of snap clips having a "U" shaped end and a tapered surface with a lip or latch face 6 proximate the bend of the "U" shaped end, which allows for easy insertion of the ends into the slots 4 and secure attachment therein once fully inserted by way of the latch face 6 catching a back surface of the cover plate slot 4. The snap clips 28 extend from the housing 20 in a manner that allows a user to compress an end length 5 of the snap clips 28 by manual pressure to release the lip from engagement with the back surface of the cover plate slot 4 for easy, tool-less removal of the housing 20 from the cover plate 12. The attachment mechanism 28 securely locks the housing 20 in place when attached to the cover plate 12 and are positioned on opposing side walls of the first end 22 of the housing.

Figure 2:
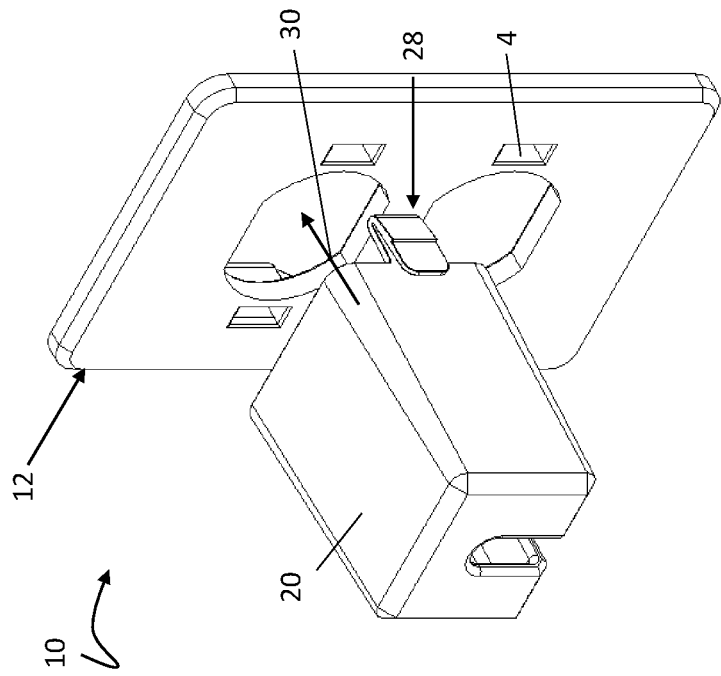
FIG. 2 is a front perspective view of the protective outlet cover and detached safety attachment.

Installation and removal is tool-less, and as illustrated in FIG. 2, arrows 30 illustrate the mechanism of insertion of the housing attachment mechanisms 28 into the cover plate slot 4. One embodiment of a latching mechanism for securing the safety housing 20 to the cover plate 12 is illustrated in further detail in FIG. 4. For example, as a user pushes the safety housing 20 into the cover plate 12, the snap clips 28 bend inward and allow the latch face 6 to pass through the corresponding cover plate slot 4, thus creating a connection. Once the latch face 6 passes beyond the back side of the cover plate 12, the snap clips 28 are allowed to return to their resting position, and lock the snap clips 28 into place. For removal, the end 5 of the clips 28 can be manually compressed to release the latch face 6 for removal from the slot 4.

The first end 22 of the housing may further be provided with a mating surface for flush connection with a face of the cover plate 12. For example, the first end may be provided with a rubber over-molding or a gasket 32 for sealing the connection to prevent or reduce the chance of contamination of the wall socket or plug connected thereto with water, dust or other debris. The gasket 32 is thus pressed up against the cover plate and prevents moisture or debris from entering the housing 20.

The cover plate 12 may also be provided with a slot backing 17 for each slot 4 which prevents debris or small objects from passing through the cover plate 12 when the housing 20 is not present. A latch face holds the housing in place until the snap clips are pressed inward and the process is reversed.

One or both of the outlet cover plate and the safety attachment are comprised of a hard plastic material, resin or like material which is electrically insulating. One or more elements of the assembly, such as an outer edge of the housing which connects to the outlet cover may have a rubber-like over-molding or rubber gasket type material provided therewith to for a leak proof seal at the point of connection.

As described herein, the safety assembly is a multi-part assembly which replaces standard electrical outlet covers and allows for the attachment of the safety device which keeps live electrical prongs from becoming exposed and making contact with children, animals, or water. The embodiments described herein increase ease of use by connecting or disconnecting via a quick connect design and provide an aesthetically pleasing sleek design, anti-unplug feature, safety rating, and splash proof rubber seal. The safety assembly described herein prevents a child from partially unplugging an electrical cable from an outlet and easily gaining access to the actively powered prongs. While the assembly described herein refers to child safety, the device can be used to protect outlets in various setting including but not limited to preventing animals from making connection or accessing a cord near the plug, or preventing water splashing onto the outlet, thus causing the risk of electrocution.

The assembly according to one or more embodiments herein may comprise an outlet cover plate and two safety housings such that the cover plate is configured to concurrently accommodate two safety housings removably secured thereto wherein the safety housings may each be substantially the same in construction.

Although the present disclosure has been described with reference to preferred embodiments, workers skilled in the art will recognize that changes may be made in form and detail without departing from the spirit and scope of the disclosure.

The invention claimed is:

1. A safety assembly comprising:
   a cover plate configured for mounting to a pre-existing electrical receptacle; and
   a safety housing for removably attaching to the cover plate, wherein the safety housing is a unitary construction having a front end and a back end wall with four side walls extending therebetween to provide an open interior, wherein the front end is substantially open and configured for securing to the cover plate, and
   wherein the cover plate comprises one or more pairs of slots positioned near an opening in the cover plate for exposing a socket of the electrical receptacle and the safety housing comprises one or more attachment mechanisms configured to removably engage with the one or more pairs of slots to removably couple the safety housing to the cover plates,
   wherein the one or more attachment mechanisms of the safety housing each have a first length that extends from a side wall of the safety housing and in a direction outwardly and away from the front end and further comprises a second length adjacent to and spaced apart from an exterior surface of the side wall from which the attachment mechanism extends, the attachment mechanism comprising a bend between the first length and second length.

2. The assembly of claim 1 wherein the safety housing further comprises a channel opening in one side wall and extending along a length of the side wall and terminating in the back end wall to provide access for a cord.

3. The assembly of claim 1 wherein the one or more attachment mechanisms of the safety housing comprise snap clips.

4. The assembly of claim 1 wherein the cover plate and the safety housing are comprised of a hard plastic.

5. The assembly of claim 1 wherein the safety housing is rectangular in shape.

6. The assembly of claim 1 wherein the safety housing has a width, a height, and a depth and wherein the width of the safety housing is less than the width of the cover plate, and the height of the safety housing is less than the height of the cover plate.

7. The assembly of claim 1 wherein the front end has a perimeter that is provided with a rubber material so as to provide a flush connection between the perimeter and the cover plate when the safety housing is attached to the cover plate.

8. The assembly of claim 1 wherein the safety housing is a first safety housing and further comprising a second safety housing and wherein the cover plate has two pairs of slots such that the cover plate concurrently supports two safety housings attached thereto.

9. A method for removably attaching a safety cover to an outlet, the method comprising:
   installing a cover plate to a pre-existing electrical receptacle;
   plugging an electrical device plug into a socket on the electrical receptacle; and
   inserting a pair of attachment mechanisms of a safety housing linearly into corresponding slots provided on the cover plate such that the housing covers the electrical device plug and feeding a cord attached to the plug through a channel extending along a length of the safety housing, wherein the attachment mechanisms each comprise a first length that extends from a side wall of the safety housing and in a direction outwardly and away from the front end and further comprises a second length adjacent to and spaced apart from an exterior surface of the side wall from which the attachment mechanism extends, the attachment mechanism comprising a bend between the first length and second length; and
   latching a lip on the second length of each attachment to an edge of the corresponding slots provided on the wall plate.

10. The method of claim 9 and further comprising pushing the safety housing linearly and into contact with the cover plate and bending the attachment mechanisms inwardly and passing the snap clips linearly through the cover plate slots wherein as the attachment mechanisms pass through the cover plate the attachment mechanisms return to a resting position where removal is selectively prevented by way of contact between a latch face of the attachment mechanism and a back surface of the cover plate.

11. The method of claim 10 and further comprising removing the safety housing by clamping the attachment mechanisms to release the latch face from connection with the back surface of the cover plate and pulling the safety housing away from the cover plate.

* * * * *